Patented Dec. 26, 1950

2,535,073

UNITED STATES PATENT OFFICE 2,535,073

PRODUCTION OF PSEUDO-KRYPTOGENINS FROM KRYPTOGENINS

Stephen Kaufmann and George Rosenkranz, Mexico City, Mexico, assignors to Syntex, S. A., Mexico City, Mexico, a corporation of Mexico No Drawing. Application September 19, 1949, Serial No. 116,623

4 Claims. (Cl. 260—239.55)

The present invention relates to a novel process for the production of cyclopentanophenanthrene compounds. More particularly the present invention relates to the production of valuable hormone intermediates such as pseudo-kryptogenin diacetate and pseudo-5,6 dihydrokryptogenin diacetate from kryptogenin diacetate and 5,6 dihydrokryptogenin diacetate.

Marker et al. (J. A. C. S. 69, 2, 200, 1947) reported the production of pseudo-kryptogenin from kryptogenin diacetate by heating the diacetate with acetic anhydride at 200° C. for twelve hours. Similarly, in U. S. Patent No. 2,352,852 granted July 4, 1944, Marker discloses the production of various pseudo derivatives by the relatively high temperature prolonged heating of the corresponding steroidal sapogenin.

The surprising discovery has been made, however, in accordance with the present invention that in the special instance of the diacetates of kryptogenin and 5,6 dihydrokryptogenin, the corresponding pseudo-kryptogenin diacetate and pseudo-5,6 dihydrokryptogenin diacetate may be obtained in excellent yield by reaction with acetic anhydride at reflux temperatures; i. e., in the neighborhood of 140° C. and in the presence of a catalytic amount of an aromatic sulphonic acid such as toluene sulphonic acid.

The mechanism of the reaction can be represented by the following equation:

The foregoing reaction has been found to be substantially complete in a relatively short length of time as, for example, about one hour and the yields were substantially better than the reaction at temperatures of the order of 200° C.

The following specific examples serve to illustrate but are not intended to limit the present invention:

Example I 10 grams of kryptogenin diacetate were dissolved in 30 cc. of acetic anhydride and thereafter 100 milligrams of toluene sulphonic acid were added. The mixture was refluxed for one hour and then poured into a water and ice mixture. The resulting precipitate was filtered off and recrystallized from methanol. A yield of 8 grams of pseudo-kryptogenin diacetate having a melting point of 93–94° C. were obtained.

Example II 10 grams of 5,6-dihydrokrytogenin were dissolved in 30 cc. of acetic anhydride and thereafter 100 milligrams of toluene sulphonic acid were added. The mixture was refluxed for one hour and poured into a water and ice mixture. The resultant precipitate was filtered off and recrystallized from methanol. A yield of 8 grams of pseudo-5,6 dihydrokryptogenin diacetate having a melting point of 96–98° C. were obtained.

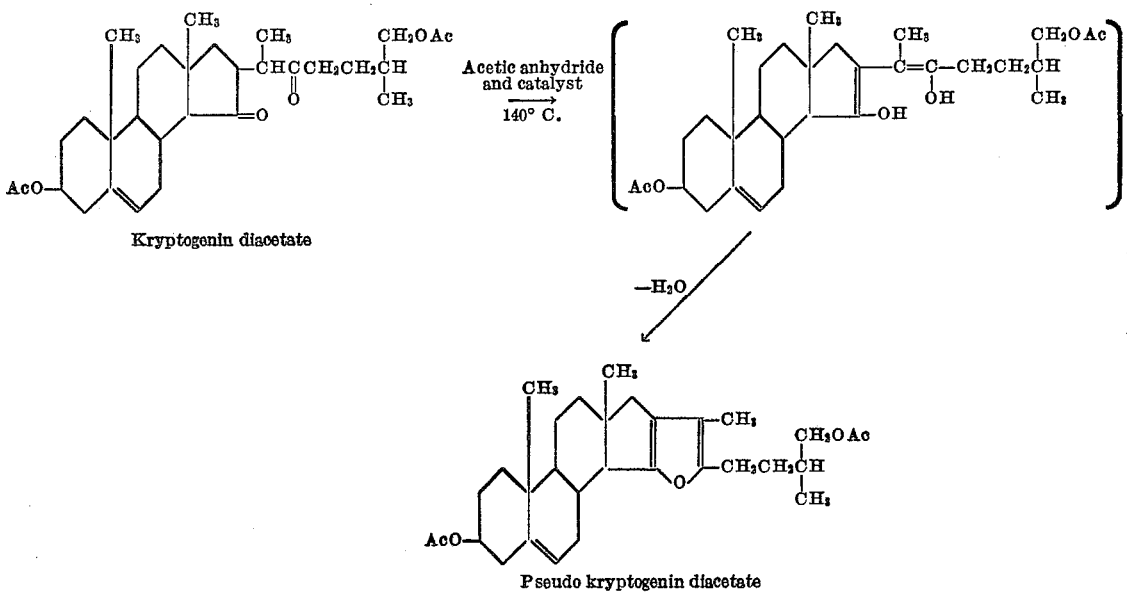

It will be obvious to those skilled in the art that various changes may be made without departing from the spirit of the invention and therefore the invention is not limited to what is described in the specification but only as indicated in the appended claims.

We claim:

1. A process for the production of a cyclopentanophenanthrene compound selected from the group consisting of pseudo-kryptogenin diacetate and pseudo-5,6 dihydrokryptogenin diacetate comprising reacting a compound selected from the group consisting of kryptogenin diacetate and 5,6 dihydrokryptogenin diacetate, with acetic anhydride under reflux conditions in the presence of a catalytic amount of an aromatic sulphonic acid.

2. A process for the production of a cyclopentanophenanthrene compound selected from the group consisting of pseudo-kryptogenin diacetate and pseudo-5,6 dihydrokryptogenin diacetate comprising reacting a compound selected from the group consisting of kryptogenin diacetate and 5,6 dihydrokryptogenin diacetate, with acetic anhydride under reflux conditions in the presence of a catalytic amount of toluene sulphonic acid.

3. A process for the production of pseudo-kryptogenin diacetate comprising reacting kryptogenin diacetate with acetic anhydride under reflux conditions in the presence of a catalytic amount of toluene sulphonic acid.

4. A process for the production of pseudo-5,6 dihydrokryptogenin diacetate comprising reacting 5,6 dihydrokryptogenin diacetate with acetic anhydride under reflux conditions in the presence of a catalytic amount of toluene sulphonic acid.

STEPHEN KAUFMANN.
GEORGE ROSENKRANZ.

REFERENCES CITED

The following references are of record in the file of this patent:

UNITED STATES PATENTS

| Number | Name | Date |
| --- | --- | --- |
| 2,352,852 | Marker | July 4, 1944 |
| 2,408,832 | Wagner | Oct. 8, 1946 |

FOREIGN PATENTS

| Number | Country | Date |
| --- | --- | --- |
| 234,924 | Switzerland | Mar. 1, 1945 |